Feb. 24, 1959  J. R. WRIGHT  2,874,610

LENS RETAINING RING

Filed Oct. 20, 1955

INVENTOR
JOHN R. WRIGHT
BY Herbert C Kimball
ATTORNEY

United States Patent Office 2,874,610
Patented Feb. 24, 1959

2,874,610

LENS RETAINING RING

John R. Wright, Eggertsville, N. Y., assignor to American Optical Company, Southbridge, Mass., a voluntary association of Massachusetts Application October 20, 1955, Serial No. 541,566

5 Claims. (Cl. 88—57)

This invention relates to the problem of effectively and economically securing a lens on its seat in whatever is used as the lens mount. Structures are known for retaining lenses on their mounts which, while highly satisfactory, are costly because of the skilled and expensive operations involved. Cheaper retaining means are apt to be unreliable.

In accordance with my invention I am able to effectively retain a lens on its seat by a lens ring of generally washer-like construction which, when in operative position against the lens rim is distorted and therefore has such a tendency to return to original or normal shape as to lock itself (and the retained lens) in operative position.

The best way I have found of distorting the lens retaining ring is by using a ring which is a continuous annulus of larger diameter than the opening containing the lens, and imparting a dished shape to the ring to introduce it into the opening. By "dished shape" I mean that it may be either a section of a cone or a section of a sphere, and because of the small difference between the inner and outer diameters of the annulus it is unimportant which.

In the drawings which illustrate my invention:

Figure 1:
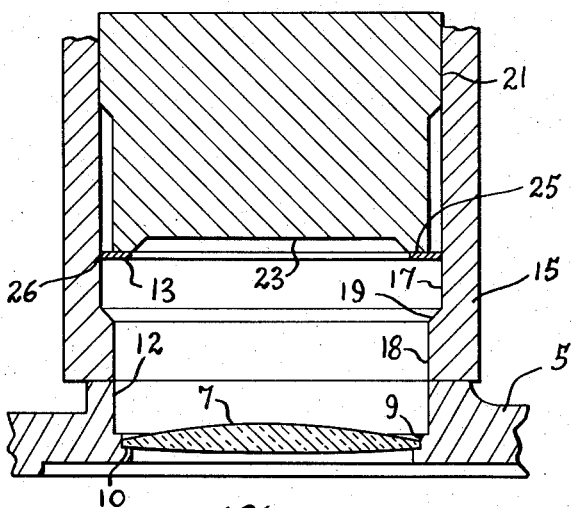
Fig. 1 is a view in axial section showing the first stage of introducing an oversize washer-like ring into the opening in which is the lens to be retained on its seat.

In the drawings a lens mount is conventionally shown at 5. The invention is obviously not limited to the particular power of lens 7 which is here depicted, and is applicable to a wide variety of lenses of circular periphery. The customary tolerances may be observed so that the periphery of the lens 7 is a proper fit in the opening 9. The closer the tolerance the less play the lens 7 has on its seat 10, but the more expense in machining the opening 9 and in edging the lens 7. In this connection it may be advantageous to enlarge the opening as at 12 for the greater part of the length of the bore, so that the close tolerances prevail only in the final section of the bore which accommodates the lens 7. My invention works equally well with this refinement or with a lens mount whose opening has a constant diameter.

Figures 2, 3:
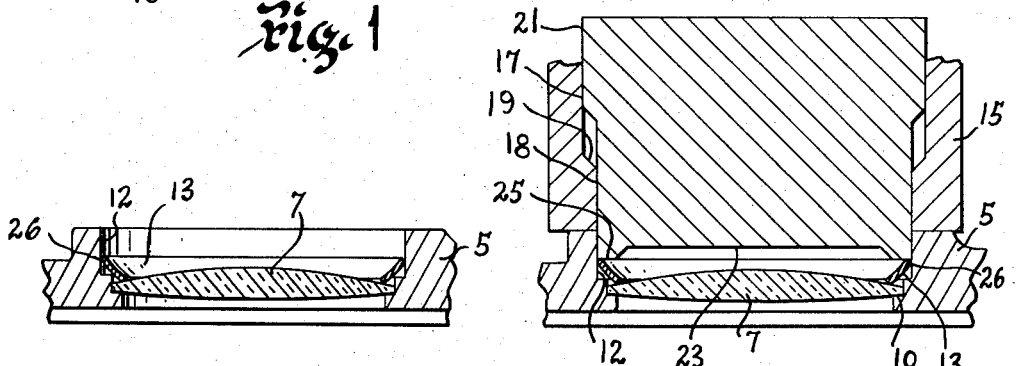
Fig. 2 is a similar view showing the second stage.
Fig. 3 is a central section through a lens retained on its seat in accordance with my invention.

I have shown in Figs. 1 and 2 one means for distorting the ring 13 in introducing it into the opening 12. A tool 15 is formed with two bores 17 and 18, the bore 17 accommodating the outside diameter of ring 13 without distortion, and the bore 18 being of substantially the same diameter as the opening 12. Between the bores 17 and 18 is an off-set 19 which engages the outer periphery of the ring 13 as the plunger 21 pushes it toward operative position seated against the lens 7 (see Fig. 2). The end portion of plunger 21 is hollowed out at 23 to accommodate lenses of plus power, and the entire end portion is of reduced diameter so as to enter the bore 18.

There is in effect a bead or flange 25 on the end of the plunger which engages the inner portion of annulus 13 (see Fig. 1), and when the annulus 13 reaches offset 19 a dished shaped is imparted to the annulus 13 as it passes the offset 19, which shape is retained as it moves along the bores 18 and 12 (see Fig. 2).

To give my invention the widest applicability the washer-like ring 13 should be made of resilient material. Moreover, the relative hardness of the ring 13 and of the wall 12 of the lens mount 5 should be such that the edge of the ring 13 will dig into the wall. In one application to a lens mount, I have used aluminum for the mount 5 and beryllium copper for the ring 13. When the difference in hardness is large, the angle to which the annulus 13 should be distorted in order to make its edge bite in is less. In general a considerable variation in this angle is allowable. I find an angle of approximately 45° most effective, when causing the edge to bite in is a problem.

An additional expedient for more securely retaining the ring in operative position is to sharpen the outer edge as at 26. When the dish-shaped ring is forced within the opening in the lens mount, the sharp edge 26 tends to dig into the wall 12 as the ring tends to return to normal shape.

Figure 4:
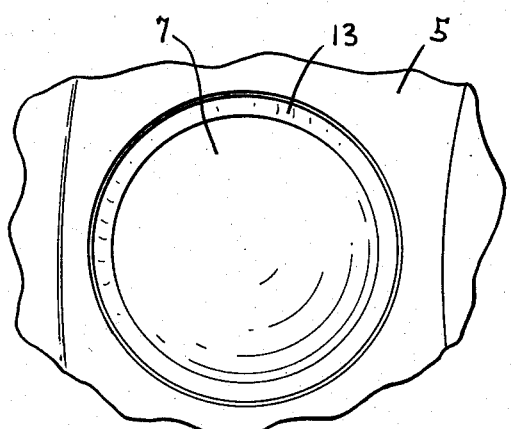
Fig. 4 is a plan view of the seated lens shown in Fig. 3.

It will be apparent from the foregoing description that a retaining ring may, in accordance with my invention, be applied at relatively low cost. The ring itself is inexpensive and but minimum skill is called for in applying it to lock the lens against its seat as shown in Figs. 3 and 4. The plunger 21 need be pushed only far enough (limited by a stop if desired) to cause the ring 13 to touch the edge of the lens 7 on the opposite side from the seat 10. Any force beyond this exerted on the plunger 21 tends to expand ring 13, thereby embedding its edge in wall 12. After the ring 13 is seated, any accidental pressure on the opposite side of lens 7 (the side toward the seat 10) tends to imbed the edge of ring 13 in wall 12.

An important advantage of my invention is that the expensive threading of the parts to be assembled is avoided. Another important advantage is that extra thickness of the mount 5 for a threaded connection is not necessary, and accordingly a very compact arrangement is obtained.

I claim:

1. In combination a lens mount having a seat in a cylindrical opening therein, a lens seated in said opening and a resilient lens ring initially of generally flat washer-like construction forced into a dished shaped in said opening, said lens ring engaging said lens to retain the same on its seat, said lens ring being initially of slightly larger diameter than said opening and being distorted so that its outer edge portion forcefully engages said cylindrical wall to anchor said lens in position on its seat by being forced into said opening.

2. In combination a lens mount having a seat in a cylindrical opening therein, a lens seated in said opening and a resilient lens ring initially of generally flat washer-like construction, said lens ring being forced into said cylindrical opening and being a continuous annulus of sufficiently larger diameter than said opening to be distorted from its normal flat shape so as to drive its canted outer edge portion against the cylindrical walls of said opening.

3. In combination a lens mount having a seat in a cylindrical opening therein, a lens seated in said opening and a resilient lens ring initially of generally flat washer-like construction with a sharp edge, said lens ring being initially a continuous flat annulus of slightly larger diameter than said opening, and being distorted into a dished shape with said sharp edge engaged with the wall of said opening to retain said lens seated in said opening.

4. In combination a lens mount having a seat in a cylindrical opening therein, a lens seated in said opening and a resilient lens ring initially of generally flat washer-like construction retaining the lens on its seat, said lens ring in its initial flat condition being of slightly larger diameter than said opening and being distorted and forced into said cylindrical opening, said lens ring in its distorted condition being dish shaped and making annular contact with said lens with its inner edge portion and making incipient penetration of the walls of said opening with its outer edge portion.

5. The combination as claimed in claim 4 in which the edge engaging the lens and the edge engaging the wall are on the same side of the ring, the first mentioned edge being in a plane displaced axially from the plane of the second edge due to said distortion.

References Cited in the file of this patent

UNITED STATES PATENTS

| | | |
|---|---|---|
| 1,687,818 | Wollensak | Oct. 16, 1928 |
| 2,161,368 | McLeod | June 6, 1939 |
| 2,203,660 | Young | June 4, 1940 |
| 2,351,747 | Eckert | June 20, 1944 |
| 2,373,610 | Stegeman | Apr. 10, 1945 |
| 2,399,832 | Schmitz | May 7, 1946 |
| 2,435,908 | Tinnerman | Feb. 10, 1948 |
| 2,691,322 | Wittel | Oct. 12, 1954 |